US008714361B2

(12) United States Patent
Ellis

(10) Patent No.: US 8,714,361 B2
(45) Date of Patent: May 6, 2014

(54) PROCESS FOR THE SEPARATION OF MATERIALS FROM RECYCLED ELECTROCHEMICAL CELLS AND BATTERIES

(75) Inventor: Timothy W. Ellis, Dallas, TX (US)

(73) Assignee: RSR Technologies, Inc., Dallas, TX (US)

( * ) Notice: Subject to any disclaimer, the term of this patent is extended or adjusted under 35 U.S.C. 154(b) by 1031 days.

(21) Appl. No.: 12/776,822

(22) Filed: May 10, 2010

(65) Prior Publication Data

US 2011/0272331 A1 Nov. 10, 2011

(51) Int. Cl.
*B02C 23/10* (2006.01)
*B02C 23/14* (2006.01)
*B03B 9/06* (2006.01)
*B03D 1/02* (2006.01)
*B03D 1/08* (2006.01)

(52) U.S. Cl.
USPC ............. 209/164; 209/166; 209/167; 241/19; 241/20; 241/21; 241/24.1; 241/24.13; 241/24.18; 241/24.25; 241/24.28

(58) Field of Classification Search
CPC .......... B02C 23/10; B02C 23/14; B02C 9/06; B02C 2009/066; B03D 1/02; B03D 1/08
USPC ............. 209/164, 166, 167; 241/24.1, 24.13, 241/24.18, 24.25, 24.28, 19, 20, 21
See application file for complete search history.

(56) References Cited

U.S. PATENT DOCUMENTS

| | | | |
|---|---|---|---|
| 1,826,724 A | 10/1931 | Booss et al. | |
| 3,881,954 A | 5/1975 | Maskalick | |
| 3,985,650 A | 10/1976 | Saitoh et al. | |
| 4,118,219 A | 10/1978 | Elmore et al. | |
| 4,253,942 A * | 3/1981 | Gaumann | 209/17 |
| 4,713,304 A | 12/1987 | Rao et al. | |
| 5,849,063 A | 12/1998 | Myerson et al. | |
| 6,267,923 B1 | 7/2001 | Albert et al. | |
| 6,351,878 B1 | 3/2002 | Rao | |

FOREIGN PATENT DOCUMENTS

WO WO-2005/015668 A1 2/2005
WO WO-2008/022415 A1 2/2008

OTHER PUBLICATIONS

Stevenson, M., "Recycling: Lead-Acid Batteries: Overview," *Encyclopedia of Electrochemical Power Sources*, pp. 165-178, 2009, Elsevier B.V., Editor-in-Chief: Jurgen Garche.
Sloop, S.E., Kotaich, K., Ellis, T.W., & Clarke, R., "Recycling: Lead-Acid Batteries: Electrochemical," *Encyclopedia of Electrochemical Power Sources*, pp. 179-187, 2009, Elsevier B.V., Editor-in-Chief: Jurgen Garche.
Kotaich, K. & Sloop, S.E., "Recycling: Lithium and Nickel-Metal Hydride Batteries," *Encyclopedia of Electrochemical Power Sources*, pp. 188-198, 2009, Elsevier B.V., Editor-in-Chief: Jurgen Garche.
Scott, K., "Recycling: Nickel-Metal Hydride Batteries," *Encyclopedia of Electrochemical Power Sources*, pp. 199-208, 2009, Elsevier B.V., Editor-in-Chief: Jurgen Garche.
Xu, J., Thomas H.R., Francis R.W., Lum, K.R., Wang, J., Liang, B., "A review of processes and technologies for the recycling of lithium-ion secondary batteries," *Journal of Power Sources*, vol. 177, Jan. 2008, pp. 512-527.
S. M. Shin, N. H. Kim, J. S. Sohn, D. H. Yang, Y. H. Kim, "Development of a metal recovery process from Li-ion battery wastes," *Hydrometallurgy*, vol. 79, Issues 3-4, Oct. 2005, pp. 172-181.
Junmin Nan, Dongmei Han, Xiaoxi Zuo, "Recovery of metal values from spent lithium-ion batteries with chemical deposition and solvent extraction," *Journal of Power Sources*, vol. 152, Dec. 1, 2005, pp. 278-284.
Rong-Chi Wanga, Yu-Chuan Lina, She-Huang Wub, "A novel recovery process of metal values from the cathode active materials of the lithium-ion secondary batteries," *Hydrometallurgy*, vol. 99, Issues 3-4, Nov. 2009, pp. 194-201.
Y. Pranolo, W. Zhang, C.Y. Cheng, "Recovery of metals from spent lithium-ion battery leach solutions with a mixed solvent extractant system," *Hydrometallurgy*, vol. 102, Issues 1-4, Apr. 2010, pp. 37-42.
Baoping Xin, Di Zhang, Xian Zhang, Yunting Xia, Feng Wu, Shi Chen, Li Li, "Bioleaching mechanism of Co and Li from spent lithium-ion battery by the mixed culture of acidophilic sulfur-oxidizing and iron-oxidizing bacteria," Bioresqurce Technology, vol. 100, Issue 24, Dec. 2009, pp. 6163-6169.
Li L, Ge J, Wu F, Chen R, Chen S, Wu B, "Recovery of cobalt and lithium from spent lithium ion batteries using organic citric acid as leachant," *J. Hazard Mater.*, 176(1-3), Apr 15, 2010, pp. 288-293.
M Contestabile, S Panero, B Scrosati, "A laboratory-scale lithium-ion battery recycling process," Journal of Power Sources, vol. 92, Issues 1-2, Jan. 2001, pp. 65-69.
Daniel Assumpção Bertuola, Andrea Moura Bernardesa, Jorge Alberto Soares Tenóriob, "Spent NiMH batteries: Characterization and metal recovery through mechanical processing," Journal of Power Sources, vol. 160, Issue 2, Oct. 6, 2006, pp. 1465-1470.
Kim, Y., Matsuda, M., Shibayama, A., Fujita, T., "Recovery of $LiCoO_2$ from Wasted Lithium Ion Batteries by using Mineral Processing Technology," *Resources Processing*, vol. 51, Issue 1, 2004, pp. 3-7.

(Continued)

*Primary Examiner* — Thomas M Lithgow
(74) *Attorney, Agent, or Firm* — K&L Gates LLP

(57) ABSTRACT

Materials in battery and electrochemical cells are separated in a form suitable for recycling by employing froth flotation techniques. Bulk materials, such as casings, are removed from converted battery scrap and the resultant pulp is subjected to froth flotation. Froth flotation agents, including frothers, collectors and/or depressants, are used to manipulate the hydrophilic and hydrophobic nature of the materials in the scrap. Hydrophobic materials are entrained in the air bubbles of the froth and float out of the froth flotation vessel while those that are hydrophilic remain in the vessel, thereby separating battery grid materials without resort to pyrometallurgical, energy intensive or other environmentally undesirable processes.

22 Claims, No Drawings

(56) References Cited

OTHER PUBLICATIONS

Pavlov, D and Kapkov, N., "Lead/Acid Battery Positive Plates Manufactured From $4PbO*PbSO_4$ Pastes Prepared from Leady Oxide and Red Lead," *Journal of Power Sources*, vol. 31, 1990, pp. 189-201.

Prengaman, R.D., "Challenges from corrosion-resistant grid alloys in lead acid battery manufacturing," *Journal of Power Sources*, vol. 95, 2001, pp. 224-233.

International Search Report and Written Opinion of the International Searchng Authority (European Patent Office) for International Patent Application No. PCT/US2011/035528, Aug. 26, 2011.

* cited by examiner

PROCESS FOR THE SEPARATION OF MATERIALS FROM RECYCLED ELECTROCHEMICAL CELLS AND BATTERIES

BACKGROUND OF THE INVENTION

Recycling of electrochemical cells and batteries is both economically and environmentally important. At the present time greater than 98% of lead acid batteries are recycled. Recycling of rechargeable and non-rechargeable consumer cells, e.g. button, D, C, AA and AAA size, that take advantage of Li-ion, Zn-carbon and Zn alkaline chemistries is also desirable.

Currently recycling is dominated by pyrometallurgical refining. Pyrometallurgical processes are not environmentally optimal, as they cause carbon dioxide emissions and generate waste materials, such as slag and dross. These methods of reprocessing spent materials are also costly due to the high energy intensity of pyrometallurgy.

In current recycling practice the spent batteries and cells are first sent to a breaking or shredding operation where they a subjected to mechanical comminution. Polymeric materials used in the cell casing are removed from the crushed batteries by a sink/float operation in which the low density plastics are floated away from the other materials due to density differences. In the case of lead acid batteries, the paste is then processed in a pyrometallurgical operation in which the materials are heated to >1000° C. in a chemical reducing atmosphere. In this operation the lead based compounds (i.e. $PbSO_4$, $PbO_2$, PbO) are chemically reduced to metallic lead which is removed for further metallurgical refining. These are very energy intensive processes, particularly in light of the fact that much of the lead produced in this operation is re-converted to lead oxides for use in the manufacturing of new lead acid batteries.

Carbon is present in many batteries as an electrochemically active material, such as an anode in a Li-ion cell, or as a modifier to improve electrical conductivity in the electrochemically active material, or to add a capacitive element to the battery to improve charge/discharge properties. When pyrometallurgical recycling techniques are used, the carbon can lead to excess carbon dioxide emissions and difficulty in maintaining the proper $CO_2$/CO ratio for effective smelting. Conventional pyro- and hydrometallurgical recycling processes for these cells also often render the carbon inactive, making it unsuitable for reuse in the construction of new batteries.

During the recycling process the presence of carbon can also limit the effectiveness of leaching, electrostatic and density driven separation processes. This has been found in recycling of both lead acid and non lead acid batteries, e.g. Li-ion, nickel-metal hydride and zinc based batteries. Specifically, in the case of leaching, where chemically active solutions are used to recover and separate metallic species, carbon can fowl colloidal suspensions which remove the leachant from the process. Carbon can be contaminated by the reagents used in hydrometallurgical operation, making disposal environmentally difficult. Therefore, removal of carbon prior to the recycling of batteries is beneficial.

While froth flotation has been used in other fields, it has not had application in the field of battery and electrochemical cell recycling. It has now been discovered that by using froth flotation technology to separate certain compounds during recycling of batteries, the thermochemical reduction step used in current recycling processes can be avoided. When froth flotation processes are used, the cost of producing recycled material suitable for reuse in the construction of new lead based electrochemical cells relative to pyrometallurgical processes can be reduced. Use of the froth flotation technique in recycling also has a reduced environmental impact relative to prior art pyrometallurgical techniques, as undesirable emissions are reduced or eliminated. When carbon is removed by froth flotation, the disadvantages associated with carbon can be avoided. In particular, carbon separated by froth flotation can be used directly in battery manufacture. Likewise, other battery materials separated by froth flotation are also of a grade suitable for direct use in battery manufacture.

SUMMARY OF THE INVENTION

Froth flotation is used during battery recycling to separate materials. Lead compounds present in lead acid batteries may be recovered using froth flotation. Carbon materials in batteries can also be separated from the battery materials by froth flotation.

In the practice of the invention, batteries can be subjected to conventional breaking or comminution operations. The materials left after this operation are then subjected to a froth flotation process. The froth flotation process involves manipulating the hydrophilic and hydrophobic characteristics of the materials to be separated. When the treated materials are sparged with air, the hydrophobic materials adhere to the air bubbles and float to the surface, where they can be removed. The hydrophilic materials either stay in solution or sink.

More particularly, the invention provides an improved method of separating materials during recycling of batteries comprising (a) comminuting the battery, (b) removing casing materials, (c) suspending the resultant battery pulp in water in a vessel, (d) adding a froth flotation agent to the pulp, (e) sparging the vessel with air to create a froth whereby hydrophobic materials are entrained with the air bubbles, and (f) allowing the entrained materials to float to the top of the vessel and floating the entrained materials out of the vessel.

DETAILED DESCRIPTION OF THE INVENTION

According to the present invention, froth flotation is used to separate certain materials in spent batteries and electrochemical cells. As used in this application, references to batteries should be understood to include all types of batteries and electrochemical cells. The techniques included in the methods of the present invention may be used in lieu of prior art pyrometallurgical techniques that are environmentally less desirable due to cost, energy consumption and emissions.

As noted above, in current recycling practices, spent batteries and cells are first sent to a breaking operation where they a subjected to mechanical comminution. Polymeric materials used in the cell casing are removed from the crushed batteries by a sink/float operation in which the low density plastics are floated away from the other materials due to density differences. In the practice of the present invention, this preliminary comminution and removal process may be employed. The residual material is thereafter subjected to froth flotation separation.

Froth flotation separation is accomplished by manipulating the hydrophilic/hydrophobic characteristics of surfaces of the materials to be separated. Hydrophilic surfaces will tend to associate with water while hydrophobic surfaces will associate with a non-aqueous phase, for example, air or oil. To manipulate the hydrophilicity/hydrophobicity of a surface, chemical agents are used which preferentially attach themselves to the surface of a material. This is commonly achieved by creating an aqueous suspension to which the appropriate agents for manipulating the hydrophilic and hydrophobic characteristics of the materials to be separated are added, normally with mixing or stirring. For purposes of this application, it is to be understood that a froth flotation agent is a material that is suitable to manipulate the hydrophobic and/or hydrophilic nature of the material to be separated. After treatment with these agents, the suspension is passed to a vessel sparged with air. In this vessel hydrophobic materials adhere to air bubbles and are floated to the surface for removal preferentially versus the hydrophilic materials which sink or remain in the water. In this manner, materials may be separated from one another.

The methods of the present invention have application to separation of any battery components, the hydrophilic and hydrophobic nature of which can be manipulated relative to one another. Among the materials present in recycled battery materials suitable for separation via froth flotation are lead compounds and carbon. Although froth flotation has not been used where the cations in the materials to be separated are the same, in the practice of the present invention froth flotation has been found particularly suitable for separation of Pb(IV) from Pb(II) compounds. Similarly, it is possible to separate nickel compounds present in batteries from one another.

Commercially available froth flotation cells may be used in the practice of the invention. One suitable cell is the Denver D-12 cell. The material to be subjected to froth flotation is placed into the cell, preferably with a frothing agent. Suitable frothers include alcohols, pine oils, polyglycols, polyoxyparafins and xylenol. These reagents stabilize the formation of air entraining bubbles which effect separation based upon the modified hydrophobic and hydrophilic nature of materials being separated. Reagents known as collectors may also be added to the cell. Collectors help the hydrophobic materials float and/or adhere to the air bubbles. Depressants also may be added to the cell. Depressants help the hydrophilic materials sink and/or not become entrained in the froth.

Reagents which affect the hydrophobic and hydrophilic nature of the materials to be separated include fatty acids (e.g. sterates, oleates), xanthates, dithiophosphates, lignosulphonates, xximes, ureas and aminosulphonates. These reagents act to alter the characteristics of the species being separated. These reagents are added to the froth flotation cell according to conventional techniques.

Reagents which modify the absorption behavior of the aforementioned reagents are desirably used to improve the separation of the lead compounds. These modifiers include bases (e.g. CaO, NaOH, NaCO$_3$), acids (H$_2$SO$_4$, HCl, HNO$_3$), organics (e.g. dextrin, starch, glue), cations (Pb$^{+2}$, Ba$^{2+}$, Ca$^{2+}$, Cu$^+$, Pb$^{2+}$, Zn$^{2+}$, Ag$^+$) and/or anions (SiO$_3^{2-}$, PO$_4^{3-}$, CN$^-$, CO$_3^{2-}$, S$^{2-}$).

Lead acid batteries are the dominant technology for energy storage in automotive starter, lighting and ignition batteries, uninterruptible power supplies, electric vehicles, telecommunications and alternative energy. The method of the present invention has particular application to lead acid batteries. In normal cell construction the battery consists of electrically active lead compounds and lead-based electrical conductors, along with casing material, usually a polymer. Table 1 below sets forth the typical composition of a spent lead acid battery.

TABLE 1

| Component | Fraction % |
|---|---|
| PbSO4 | 50-60 |
| PbO2 | 15-35 |
| PbO | 5-10 |
| Pb | 2-5 |
| Other | 2-4 |
| Total Active Material | 70-90 |
| Pb Grids, poles, top metal | 5-25 |

TABLE 1-continued

| Component | Fraction % |
|---|---|
| Polymer case material | 5 |
| Total | 100 |

These fractions may vary somewhat in practice due to individual battery design and the charge/discharge profiles seen during use in an application.

When the present invention is employed, the active materials from lead acid batteries may be recycled for reuse in the manufacture of new lead acid batteries while avoiding the use of pyrometallurgical operations. In particular, in the recycling method of the present invention, froth flotation technology (rather than a pyrometallurgical operation) may be used to separate Pb(IV) materials, such as lead dioxide, from Pb(II) materials, such as lead oxide or lead sulfate.

To effect separation of the lead products according to the froth flotation method, the spent lead based batteries or cells are subjected to conventional breaking operations to mechanically comminute the battery or cell. Conventional techniques for removing polymeric casing materials from the crushed battery or cell are employed. This may be accomplished using a conventional sink/float operation in which the relatively low density plastics are floated away from the higher density lead based materials.

The resulting lead containing battery paste is subjected to a froth flotation process. Preferably before subjecting the lead paste to the froth flotation process, the paste is screened to remove undesirable particles that can contaminate the recycled lead compounds and/or contain particles with both Pb(IV) and Pb(II) compounds. The screening process desirably removes material that is greater than a 200 μm size.

To effect the froth flotation separation, the lead bearing paste is suspended in water, preferably with stirring or mixing. Froth flotation agents are added and blended to create what the art terms a "pulp" to be subjected to froth flotation. Any agent may be used that causes the particles to be separated to become hydrophobic and hydrophilic relative to each other so that the hydrophobic material to be separated will become entrained in air bubbles passed through the solution while the hydrophilic material remains in the solution and sinks. In the case of lead particles in the aqueous suspension, the hydrophobic materials will attach themselves to air bubbles produced by the froth flotation apparatus and thereby be separated from the hydrophilic particles during the froth flotation step. A Denver type of froth flotation device may be used. However, other configurations are also amenable for this purpose. For example, the froth flotation vessel may have a cascading arrangement as in the Denver cell in which the material to be separated is frothed through a series of cascading vessels or it may be a single vessel having a height that is effective to foster flotation over the top of only the hydrophobic materials. Separation is accomplished as the air bubbles float to the surface of the bath carrying away hydrophobic particles in deference to the hydrophilic particles which remain suspended in the aqueous bath.

Separation can be achieved by modifying the hydrophobic and hydrophilic nature of PbO$_2$ and PbSO$_4$ using froth flotation agents known as collectors. Suitable collectors include fatty acids (e.g. sterates, oleates), xanthates, dithiophosphates, lignosulfonates, oximes, ureas, aminosulphonates. These collectors act as surface active species allowing separation of Pb (IV) and Pb (II) compounds in aqueous media. This separation can be effected with and without frothers, such as alcohols, pine oils, polyglycols, polyoxyparafins, xylenol. Additionally modifiers can effect/affect the absorption of the flotation reagents upon each inorganic phase. Among modifiers useful in froth flotation are pH modifiers such as bases (e.g. CaO, NaOH, $NaCO_3$), acids ($H_2SO_4$, HCl, $HNO_3$), neutral organics (e.g. dextrin, starch, glue), cations ($Pb^{+2}$, $Ba^{2+}$, $Ca^{2+}$, $Cu^+$, $Pb^{2+}$, $Zn^{2+}$, $Ag^+$) and/or anions ($SiO_3^{2-}$, $PO_4^{3-}$, $CN^-$, $CO_3^{2-}$, $S^{2-}$). These frothers can modify the absorption behavior of the aforementioned flotation agents.

Froth flotation also can be applied to the removal of carbon from various materials as it is naturally hydrophobic. However, because a change in the surface chemistry of the carbon occurs when used in batteries, use of surface active chemical reagents is desirable to improve the floatability of carbon and to produce a product suitable for reuse in battery construction. This process of carbon separation by froth flotation may be improved by the removal of organic binders associated with electrode manufacturing.

The process of the invention also has application to recycling lithium batteries. A patent by Sloop, "System and method for removing an electrolyte from an energy storage and/or conversion device using a supercritical fluid," U.S. Pat. No. 7,198,865, teaches the use of supercritical $CO_2$ to remove the electrolyte from spent Li-ion and other cells. Combining this method with vacuum outgassing and/or extraction with suitable solvents can remove adherent organic compounds thereby improving the froth flotation separation by increasing the degree of difference between the hydrophilic and hydrophobic compounds making up the electrochemical cell.

The following general procedures may be used to effect froth flotation separation of materials in batteries.

First, the batteries are shredded to expose the contents for subsequent removal. In the second step the batteries are subjected to mechanical comminution, e.g. tumbling, shaking, vibration, to free the active materials from the cases, separators and cathode/anode conductive grids. At this point the third unit operation is to size classify the material removing the material to be floated which is nominally <200 um from larger scrap consisting of again cases, separators and anode/cathode grids. This size classification can be done by screening wet or dry, wet elutriation or air classification. Our preferred methodology is wet screening or elutriation which prevents the fine particulate from becoming airborne becoming an environmental/worker health issue.

Step four is the key technology which is froth flotation. Reagents are added which preferentially absorb to the surface of the Pb compounds present in spent lead acid paste. Specifically $PbO_2$, PbO and $PbSO_4$ which are present in the active material of spent lead acid batteries. Three surface modification reagents, i.e. collectors, have been shown to be efficacious. These are mercaptobenzothiazole (MBT), its sodium salt (Na-MBT) and a dialkyl dithiophosphinate (sold under the name Aerophine by Cytec). Preferably these are added to $10^{-3}$ to $10^{-1}$ weight percent. These compounds enhance the flotation of $PbO_2$ while $PbSO_4$ sinks. It was found that the addition of methyl iso-butyl carbinol (MIBC) enhanced froth stability improving separation. Also in the case of MBT, the use of a lignosulfonate depressant (product 648 produced by Borregard-Lignotech) was found to enhance the flotation of $PbO_2$, while $PbSO_4$ floated in its absence. The preferred concentrations are shown in Table 2 along with the distribution coefficient of $PbSO_4/PbO_2$.

Carbon is known to be hydrophobic in nature, i.e. water repelling. While the other active materials within batteries are hydrophilic, i.e. water attracting, e.g. lithium metal oxides and phosphates, lead, zinc, and manganese inorganic compounds. When carbon is to be separated according to the present invention, air is sparged into a vessel that contains from 10-40 volume percent solids in aqueous media. Our preference is 15-20 volume percent to support fine particles, i.e. <75 um. To improve the separation an organic phase is added to 0.1-5.0 volume percent. In preferred practice 1.0 volume percent of either methyl iso-butyl carbinol (MiBC) or kerosene is used. This enhances the flotation of the carbon by increasing the adherence of the carbon particulates to the rising air bubbles producing a carbon rich phase on the surface of the vessel. MiBC is preferred as it is easily removed from the carbon after froth flotation by vacuum outgassing at <1 torr or upon heat to 100° C. under flowing gas due to its higher vapor pressure than kerosene. The carbon reclaimed by this method is suitable to be reused in the construction of new batteries. To remove vestiges of contaminants from the carbon a washing step may be used in which impurities are removed by dissolution into acid/base solutions. This process is preferably followed by drying the material to a moisture content <10 weight percent and packaging for shipment.

The material which has not been floated that is now cleaned of carbon can be subjected to further reprocessing by hydrometallurgical, pyrometallurgical or physical purification techniques. For example, it is possible to acid leach Zn and Mn from the materials that sink in Zn—Mn cells. The leached material is then subjected to solvent extraction and electrowinning to Zn metal and MnO2. In the case of Li-ion batteries, it is also possible to reover the Li metal oxide. When the recovered material is treated hydrothermally with LiOH and heat treated at 800° C. under flowing air, material suitable for use in the production of Li ion rechargeable batteries was recovered.

This technology has particular suitability in the recycling of advanced Pb-acid batteries which incorporate large amounts of carbon to increase the capacitance of the batteries. While carbon is key to improving the charge/discharge performance of these cells, for the recycling industry this is problematic as this excess carbon is in direct conflict with the desire to reduce carbon dioxide, emissions from the commonly used pyrometallurgical recycling operations. Additionally, the removal of carbon by froth flotation is considered an important pre-step to the use of froth flotation to separate $PbO_2$ and $PbSO_4$ as carbon adsorbs the reagents used to separate the phases and contaminates the phase that is floated.

In the case of all these battery chemistries the carbons are valuable in and of themselves costing as much as $40/kg, thus representing a significant cost in battery manufacturing. Recycling this material would allow for lower costs in battery manufacturing as the recycling process is less expensive than virgin material production.

EXAMPLES

Example 1

Separation of Pb(IV) and Pb(II)

Experimental tests of the process and reagents have been demonstrated by the use of a Denver, D-12 style flotation cell obtained from Metso Minerals. The screened material, 300 grams, was placed within the Denver cell and suspended in 3 liters of water with mixing 5 minutes. Air was sparged into a vessel containing from 10-40 volume percent solids in an aqueous stream, preferably 15-20 volume percent to support fine particle flotation, i.e. <75 μm and maximum throughput. Flotation agents were added and blended for 5 minutes providing for what is termed in the art as a pulp to be subjected to froth flotation. All processing was done at pH in the range of 4-10, with a pH=7-8.5 being preferred. Other flotation cell configurations/designs are also amenable for this purpose with the Denver style being common to laboratory process evaluation.

Lead acid battery paste was obtained from the battery wrecking operations of Quemetco Metals in Indianapolis, Ind. This paste represents a mixed feed of automotive, industrial, telecommunications and power supply batteries and cells.

The material was screened to a <200 nm size using conventional methods. This screening operation can provide benefits beyond simple sizing. For example, to optimize the separation of $PbO_2$ from $PbSO_4$ based particles, the reduction or elimination of multiphase particles is desirable. Screening or size fractionation accomplishes this. Also polymer and/or glass fibers are commonly present in the active paste materials as additives for purposes of reinforcement. These additive materials in the paste consume reagents and contaminate products into which the recycled lead is to be incorporated. Therefore, removing these additives during the recycling process enhances the value of the process overall.

About 300 grams of the screened material was placed in a Denver cell D-12 style cell obtained from Metso Minerals and suspended in 3 liters of water with mixing for about 5 minutes. At this point reagents were added and blended for 5 minutes. The details of the procedure are set forth below.

Experimental Procedure:
1. Screening of paste to 200 µm in preparation for flotation
   a. Five-hundred grams of as-received Pb paste is weighed out
   b. Five-hundred milliliters of DI water is collected
   c. The paste and water are combined in a standard blender
   d. Contents are blended for five minutes to produce a uniform slurry
   e. Slurry is poured onto a 200 nm screen within a 5-gallon bucket
   f. Slurry is stirred slowly, allowing for the minerals to pass through the screen while the remaining polymer fibers are trapped
   g. Small amounts of wash water (DI) are added periodically to ensure screening is complete
   h. The bucket of screened paste is left to settle for a period of time (at least overnight)
   i. Most of the water is decanted
2. Screening of paste to 100 µm in preparation for flotation
   a. Five-hundred grams of screened paste (200 µm) is weighed out
   b. Five-hundred milliliters of DI water is collected
   c. The paste and water are combined in a standard blender
   d. Contents are blended for five minutes to produce a uniform slurry
   e. Slurry is poured onto a 100 µm screen within a 5-gallon bucket
   f. Slurry is stirred slowly, allowing for the smaller minerals to pass through the screen while the remaining larger ones are trapped
   g. Small amounts of wash water (DI) are added periodically to ensure screening is complete
   h. The bucket of screened paste is left to settle for a period of time (at least overnight)
   i. Most of the water is decanted
3. Screening of Paste to 50 µm in preparation for flotation
   a. Five-hundred grams of screened paste (100 µm) is weighed out
   b. Five-hundred milliliters of DI water is collected
   c. The paste and water are combined in a standard blender
   d. Contents are blended for five minutes to produce a uniform slurry
   e. Slurry is poured into a 50 µm filter held over a small plastic bucket
   f. Slurry is kneaded by hand slowly, allowing for the fine minerals to pass through the filter while the remaining larger ones are trapped
   g. Small amounts of wash water (DI) are added periodically to ensure screening is complete
   h. The bucket of screened paste is left to settle for a period of time (at least overnight)
   i. Most of the water is decanted
4. Milling/Grinding Paste in Preparation of Flotation
   The paste is milled and ground according to conventional procedures
5. Flotation Procedure
   a. Denver Flotation Cell is set up
   b. Three-hundred grams of screened Pb paste (Procedure 1) is weighed out
   c. Three liters of DI water are collected and added to the Denver Cell
   d. The Denver Cell is turned on with the air intake valve closed
   e. The speed is adjusted
   f. Lead paste is added
   g. Reagents are selected and added to the slurry
   h. The slurry is blended without air input for five minutes
   i. The air intake valve is opened and the slurry is allowed to mix with air for five minutes
   j. The froth is continuously skimmed from the top of the Denver Cell and deposited in an alternate tank for ten minutes
   k. Samples of the froth are collected after one minute, after five minutes, and after ten minutes
   l. The Denver Cell is turned off to let the main tank settle while the alternate is cleaned
   m. The main tank is slowly decanted and a sample of the sink is taken
   n. All samples taken during the procedure are allowed to air dry
6. Three-Tiered Flotation Procedure
   a. Denver Flotation Cell is set up
   b. Three-hundred grams of screened Pb paste (Procedure 1) is weighed out
   c. Three liters of DI water is collected and added to the Denver Cell
   d. The Denver Cell is turned on with the air intake valve closed
   e. The speed of is adjusted
   f. Lead paste is added
   g. Reagents are selected and added to the slurry
   h. The slurry is blended without air input for five minutes
   i. The air intake valve is opened and the slurry is allowed to mix with air for five minutes
   j. The froth is continuously skimmed for ten minutes and deposited in a small plastic bucket marked "Float 1"
   k. The Denver Cell is turned off
   l. The main tank is drained and rinsed into another small plastic bucket marked "Sink 1"
   m. Both buckets are allowed to settle overnight
   n. The water is slowly decanted of each bucket
   o. Small samples are taken from each for submittal
   p. The remainder of the two bucket's contents are run through Procedure 4 again, taking the place of the "Three-hundred grams of screened paste," and replacing the markings of the buckets with "Float 2" and "Sink 2" respectively q. Once step 4 has been completed for "Float 2" and "Sink 2," those buckets' contents are run through Procedure 4 a third time, marking them as "Float 3" and "Sink 3"

r. All samples taken are allowed to air dry

Efficacy of a particular reagent combination is calculated as K, which is the ratio of the materials of interest in the floated (hydrophobic) phase to the material of interest in the sink (hydrophilic) phase. A K value of 1 indicates no separation. The more the K value deviates from 1, the more desirable it becomes as the increasing K value reflects increased separation of the materials of interest. In this experiment the separation of $PbO_2$ from $PbSO_4$ was the desired objective. Therefore, K represents this separation. If K<1 the $PbO_2$ is floated. If K>1, $PbSO_4$ is floated. Which lead compound is floated depends on the chemistry of the reagents used. K values were determined by Leco Sulfur and X-Ray diffraction analysis.

In Table 2, the results of series of trials testing combinations of collectors, depressants and frothers is given.

TABLE 2

Compilation of Studies for the Separation of $PbO_2$ and $PbSO_4$

| Collector | Collector Concentration | Depressant | Depressant Concentration | Frother | Frother Concentration | K |
|---|---|---|---|---|---|---|
| NaMBT | 1.00E−02 | | | MIBC | 1.00E−02 | 0.66 |
| AP | 1.00E−02 | | | MIBC | 1.00E−02 | 0.53 |
| MBT | 1.00E−02 | 648 | 1.00E−02 | MIBC | 1.00E−02 | 0.76 |
| MBT | 1.00E−02 | | | MIBC | 1.00E−02 | 1.32 |

Example 2

Use of MBT

A flotation experiment incorporating MBT (mercaptobenzylthiazol) was conducted. MiBC was also used at this time to provide a steadier froth. This experiment was run using screened paste, requiring procedure 1, and centered on attempting to raise the pH of the slurry in order to determine its significance. Specifically, between steps 5f and 5g, flakes of NaOH were added to the slurry while monitoring the pH level. Although the attempt to raise the pH to 10 was largely unsuccessful due to a reaction between the NaOH and the $PbSO_4$, the remainder of procedure 5 was completed and samples were dried and submitted. Analysis of the "K" values reveals this combination to be highly efficient in the opposing direction, floating the $PbSO_4$ instead of the $PbO_2$.

A second flotation experiment incorporating MBT was run using screened paste, requiring procedure 1. Flotation commenced following procedure 5, with some slight alterations. During step 5j, the froth was skimmed into a small plastic bucket instead of an alternate tank. Step 5k did not take place during the action of flotation. Instead, samples were taken from the plastic bucket after sufficient time for settling had taken place, roughly overnight. The "Float Scum" sample represents the surviving organic layer after settling, whereas the "Float" sample was collected from the material that had settled out of the float bucket's solution. The "Float Scum" sample had a K=0.66 and the "Float" sample had a K=0.95.

Example 3

Use of Aerophine

As received paste was processed, therefore bypassing all of procedures 1, 2, 3, and 4 of Example 1. Procedure 5 was followed, producing samples that were dried and submitted for carbon and sulfur content analysis. Dividing the sulfur content of each float sample by the corresponding sink sample yielded a "K" value, representing the efficiency of this particular reagent combination. A "K" value less than one signified the flotation of $PbO_2$. The samples taken on this date gave K=1.04, 1.1, 0.94.

Screened paste was used per procedure 1, as was the frother MiBC. "K" values of 0.8 and 0.53 were achieved. It is believed that removal of the polymer fibers (larger than 200 μm) provided the reagents more access to the targeted minerals.

In a further experiment with aerophine, screened paste was again subjected to procedure 1 and the frother MiBC was used. Similar to the experiment mentioned above, NaOH was used between steps 5f and 5g to raise the pH and raised the pH to 8.3. The resultant "K" value was 0.89.

Example 4

Use of NaMBT

A flotation experiment incorporating NaMBT was conducted using the frother MiBC for stability. Procedures 1 and 5 were followed with a slight alteration. As with previous experiments, during step 5j, the froth was skimmed into a small plastic bucket instead of an alternate tank. Step 5k did not take place during the action of flotation. Instead, samples were taken from the plastic bucket after sufficient time for settling had taken place, roughly overnight. The results were a "K" value of 0.76 for the Float Scum, and 0.79 for the Float.

A second experiment was run in which procedures 1 and 5 were followed. The reagent combination was NaMBT with MiBC and the depressant 648. This run proceeded with the same alterations to steps 5j and 5k. A "K" value of 0.90 was achieved.

A third flotation experiment was run on the same day (Dec. 11, 2008) in which procedures 1 and 5 were followed with the same alterations to steps 5j and 5k. This time, a combination of NaMBT and the depressant 648 was used, producing a K=0.95.

Example 5

Use of Aerophine

Aerophine was tested again, this time in combination with the frother MiBC and the depressant 648. Procedures 1 and 5 were followed with a slight alteration. As with previous experiments, during step 5j, the froth was skimmed into a small plastic bucket instead of an alternate tank. Step 5k did not take place during the action of flotation. Instead, samples were taken from the plastic bucket after sufficient time for settling had taken place, roughly overnight. Although the resultant separation of lead compounds was poor (K=1.25 and 1.04), the sink was very low in carbon content.

A second flotation experiment using aerophine with MiBC was run in which procedures 1 and 5 were followed. This experiment proceeded with the same alterations to steps 5j and 5k. Results showed a "K" value of 0.94.

A third flotation experiment using a combination of aerophine and the depressant 648 was run in which procedures 1 and 5 were followed with the same alterations to steps 5j and 5k. This produced a K=0.85.

Example 6

Use of MBT

Another flotation experiment was run using MBT on screened paste (procedure 1). This time the addition of the frother MiBC was coupled with the depressant 648, a lignosulfonate. Flotation in the Denver Cell, following procedure 5, was completed and samples taken. The results showed "K" values of 0.76, 0.86, and 0.79.

A similar flotation experiment featured screened paste (procedure 1) combined with MBT and MiBC. Procedure 5 was followed, producing samples. Data from the sulfur analysis indicated "K" values of 1.3, 1.0, and 0.97.

Example 7

Three-Tiered Flotation with NaMBT

A three-tiered flotation experiment was conducted using a combination of NaMBT and MiBC. Screened paste was used per Procedure 1. Procedure 6 was followed in its entirety, producing three float samples and three sink samples. Although a float of sink 1 sample, a sink of float 1 sample, a float of sink 2 sample, and a sink of float 2 sample were also produced, the four samples were regarded as intermediate stages and rejected as irrelevant. Results of the third tier showed a stable, nearly linear separation with almost identical "K" values across all three floats (K=0.787 in first float, 0.774 in second float, and 0.787 in third float). This means that separation was occurring at close to the same rate at all three stages.

Example 8

Three-Tier Flotation with Aerophine

A three-tiered flotation experiment was completed using a combination of Aerophine and MiBC. Screened paste was used per procedure 1. Procedure 6 was followed again, producing three float samples and three sink samples. Similarly to the previously reported instance, four intermediate samples were also taken. The "K" values of Floats 1, 2, and 3 were 0.86, 1.03, and 0.98 respectively.

Example 9

Carbon Removal

The procedure for removal of carbon can be effected using procedure 1 for screening and procedures 5 and 6 for flotation.

Specifically, procedures 1 and 2 were carried out using LiMOx black mass floated with only water (NoAdd) and with the reagents MiBC, kerosene, and dodecylphenol. These reagents were chosen because of their known wetability to carbon. After flotation had been completed, the samples were dried and submitted for carbon analysis by LECO. The measured carbon content of each float sample was divided by the carbon contained in the sink to produce a "K" value used to determine the efficiency of separation. This value was calculated for all flotation results.

According to the resultant data (Table 3), the reagent MiBC produces the best separation, though simple flotation in water is nearly as efficient. It has been theorized that this efficiency is mainly due to carbon's natural hydrophobicity. The MiBC reagent merely provides a stable froth from which to draw the carbon.

TABLE 3

Flotation of LiMOx Black Mass Reagent Comparison

| Sample ID | Carbon % w | K Values |
| --- | --- | --- |
| BM, No Add, 10 min | 60.8 | 2.79 |
| BM, No Add, Sink | 21.8 | |
| BM, Kerosene, 10 min | 56.0 | 2.60 |
| BM, Kerosene, Sink | 21.5 | |
| BM, MiBC, 10 min | 70.1 | 2.85 |
| BM, MiBC, Sink | 24.6 | |
| BM, Dodecylphenol, 10 min | 35.5 | 1.45 |
| BM, Dodecylphenol, Sink | 24.4 | |

Example 10

Three-Tiered Carbon Flotation

A three-tiered flotation experiment was completed in which LiMOx Black Mass was used in conjunction with the frother MiBC. Procedures 1 and 3 were followed and samples were produced, dried, and submitted for carbon analysis. The results of this experiment are set forth in Table 4 and reflect excellent separation.

TABLE 4

Three-tiered Flotation of LiMOx + MiBC

| Sample ID | Co % w | Cu % w | Fe % w | Carbon % w | Carbon K Value |
| --- | --- | --- | --- | --- | --- |
| BM + MiBC Float | 29.30 | 0.27 | 0.07 | 41.04 | 1.96 |
| BM + MiBC Float x2 | 25.30 | 0.27 | 0.07 | 53.84 | 3.12 |
| BM + MiBC Float x3 | 20.70 | 0.29 | 0.06 | 68.55 | 2.97 |
| BM + MiBC Float of Sink | 35.50 | 0.28 | 0.09 | 32.06 | |
| BM + MiBC Float of Sink of Sink | 27.20 | 0.30 | 0.08 | 47.80 | |
| BM + MiBC Sink | 39.70 | 0.36 | 0.07 | 20.96 | |
| BM + MiBC Sink x2 | 42.00 | 0.38 | 0.07 | 17.23 | |
| BM + MiBC Sink x3 | 41.10 | 0.37 | 0.07 | 23.08 | |
| BM + MiBC Sink of Float | 39.20 | 0.26 | 0.06 | 28.95 | |
| BM + MiBC Sink of Float of Float | 30.40 | 0.25 | 0.05 | 46.25 | |

The samples listed above were resubmitted for X-ray analysis and another round of carbon testing by LECO. The resubmitted set of data (Table 5) was very similar to the initial, except for the second tier sink.

TABLE 5

| Sample ID | Carbon % w | Sulfur % w | K Values |
| --- | --- | --- | --- |
| BM + MiBC Float | 41.10 | N/A | 2.069486 |
| BM + MiBC Float x2 | 52.95 | N/A | 2.355427 |
| BM + MiBC Float x3 | 66.39 | N/A | 2.774342 |
| BM + MiBC Sink | 19.86 | N/A | |
| BM + MiBC Sink x2 | 22.48 | N/A | |
| BM + MiBC Sink x3 | 23.93 | N/A | |

Eight-hundred grams of Zn black mass was wet screened according to Procedure 1. Flotation of the black mass (less than 200 μm) was effected per Procedure 2. The four samples were allowed to air dry for two weeks before preparation and submittal.

It is clear from the results (Table 6) that the separation of the carbon between the float and the sink is efficient, similar to previous results with the LiMOx Black Mass.

TABLE 6

| Sample ID | Carbon % w | K Value |
|---|---|---|
| Screened Zn—C BM | 6.02 | 2.03 |
| Screened Zn—C BM + MiBC Float 1 min | 8.67 | 2.92 |
| Screened Zn—C BM + MiBC Float 5 min | 7.87 | 2.65 |
| Screened Zn—C BM + MiBC Float 10 min | 7.26 | 2.44 |
| Screened Zn—C BM + MiBC Sink | 2.97 | |

What is claimed is:

1. A method of separating materials in battery scrap, comprising:
   a. comminuting a battery,
   b. removing casing materials,
   c. suspending resultant battery pulp in water in a froth flotation vessel,
   d. adding a froth flotation agent to the pulp,
   e. sparging the vessel with air to create a froth, wherein hydrophobic materials are entrained with air bubbles, and
   f. allowing the entrained materials to float to the top of the vessel and floating the entrained materials out of the vessel,
   wherein the battery pulp contains lead compounds and the froth flotation agent comprises at least one compound selected from the group consisting of mercaptobenzothiazole, sodium mercaptobenzothiazole, and dialkyl dithiophosphinate.

2. The method of claim 1 wherein a frother is added to the vessel in step d.

3. The method of claim 1 wherein a depressant is added to the vessel in step d.

4. The method of claim 1 wherein the battery pulp contains both Pb(II) and Pb(IV) compounds.

5. The method of claim 1 wherein the froth flotation vessel comprises a Denver cell.

6. The method of claim 1, wherein lead dioxide ($PbO_2$) is separated from lead oxide (PbO) and/or lead sulfate ($PbSO_4$) in the froth flotation vessel.

7. The method of claim 6, further comprising producing a new battery comprising the separated lead dioxide ($PbO_2$).

8. A method comprising:
   suspending a lead-acid battery paste in water;
   adding a froth flotation agent to the suspension comprising the lead-acid battery paste and water;
   sparging a froth flotation vessel containing the suspension with a gas to create a froth; and
   separating lead dioxide ($PbO_2$) from other lead-containing compounds in the suspension in the froth flotation vessel.

9. The method of claim 8, wherein lead dioxide ($PbO_2$) is separated from lead oxide (PbO) and/or lead sulfate ($PbSO_4$) in the froth flotation vessel.

10. The method of claim 8, further comprising removing the lead-acid battery paste from battery scrap before suspending the lead-acid battery paste in water.

11. The method of claim 8, further comprising classifying the lead-acid battery paste to particle sizes of less than 200 micrometers before suspending the lead-acid battery paste in water.

12. The method of claim 8, further comprising producing a new battery comprising the separated lead dioxide ($PbO_2$).

13. A method comprising:
   suspending a battery paste in water, the battery paste comprising carbon and lead compounds;
   adding a froth flotation agent to the suspension comprising the battery paste and water;
   sparging a froth flotation vessel containing the suspension with a gas to create a froth; and
   separating the carbon from the lead compounds in the froth flotation vessel.

14. The method of claim 13, wherein the froth flotation agent comprises at least one of methyl isobutyl carbinol or kerosene.

15. The method of claim 13, further comprising, after separating the carbon from the lead compounds:
   adding a second froth flotation agent to a suspension comprising the separated lead compounds and water;
   sparging a froth flotation vessel containing the suspension comprising the lead compounds, the second froth flotation agent, and the water with a gas to create a froth; and
   separating Pb(IV) compounds from other lead-containing compounds in the suspension in the froth flotation vessel.

16. The method of claim 15, wherein the second froth flotation agent comprises at least one compound selected from the group consisting of mercaptobenzothiazole, sodium mercaptobenzothiazole, and dialkyl dithiophosphinate.

17. The method of claim 15, wherein the Pb(IV) compounds are separated from Pb(II) compounds in the froth flotation vessel.

18. The method of claim 15, wherein lead dioxide ($PbO_2$) is separated from lead oxide (PbO) and/or lead sulfate ($PbSO_4$) in the froth flotation vessel.

19. The method of claim 18, further comprising producing a new battery comprising the separated lead dioxide ($PbO_2$).

20. The method of claim 13, further comprising producing a new battery comprising the separated carbon.

21. The method of claim 13, further comprising removing the battery paste from battery scrap before suspending the battery paste in water.

22. The method of claim 13, further comprising classifying the battery paste to particle sizes of less than 200 micrometers before suspending the battery paste in water.

* * * * *